United States Patent [19]

Bales et al.

[11] Patent Number: 5,062,108

[45] Date of Patent: Oct. 29, 1991

[54] ISDN CODESET CONVERSION

[75] Inventors: Bruce M. Bales, Louisville; Rebecca J. McGillin, Broomfield; Paul E. Miller, Northglenn, all of Colo.

[73] Assignee: AT&T Bell Laboratories, Murray Hill, N.J.

[21] Appl. No.: 414,987

[22] Filed: Sep. 29, 1989

[51] Int. Cl.$^5$ .......................... H04J 3/12; H04J 3/24
[52] U.S. Cl. ................................ 370/110.1; 370/94.1
[58] Field of Search .................... 370/94.1, 94.2, 94.3, 370/60, 60.1, 110.1

[56] References Cited

U.S. PATENT DOCUMENTS

| | | | |
|---|---|---|---|
| 4,882,727 | 11/1989 | Williams et al. | 370/110.1 |
| 4,926,420 | 5/1990 | Shimizu | 370/94.1 |
| 4,961,185 | 10/1990 | Sawada | 370/110.1 |
| 4,991,133 | 2/1991 | Davis et al. | 370/94.1 |

OTHER PUBLICATIONS

International Telegraph and Telephone Consultative Committee (CCITT), IXth Plenary Assembly, Melbourne, 1988, Document AP IX-123-E, Jun. 1988, pp. 10-178.
International Telegraph and Telephone Consultative Committee (CCITT), IXth Plenary Assembly, Melbourne, 1988, Document AP IX-124, E, Jun. 1988, pp. 1-86.
International Telegraph and Telephone Consultative Committee (CCITT), IXth Plenary Assembly, Melbourne, 1988, Document AP IX-125-E, Jun. 1988, pp. 1-79.

Primary Examiner—Douglas W. Olms
Assistant Examiner—Wellington Chin
Attorney, Agent, or Firm—John C. Moran

[57] ABSTRACT

In a telecommunication switching system, an apparatus for automatically converting ISDN codeset and codepoint protocol in messages transmitted to the telecommunication switching system from a plurality of other telecommunication switching systems each using a diffrent ISDN codeset and codepoint protcol than the telecommunication switching system to identify the same data information. All telecommunication switching systems are interconnected by data channels. Further, the apparatus is responsive to another ISDN message generated by the telecommunications switching system for transmission to another one of the plurality of telecommunication switching systems to convert the codeset and codepoint protocol of the other message to the codepoint and codeset protocol of the other one of the plurality of telecommunication switching systems. The conversions are performed by using sets of conversion tables each identified with an ISDN data channel, and the identity of the data channel is used to select which set of tables is to be used to convert a codeset and codepoint protocol.

10 Claims, 15 Drawing Sheets

ISDN SOFTWARE STRUCTURE

L2-L3 MESSAGE I/O 301

Q.931 MESSAGE HANDLING 302

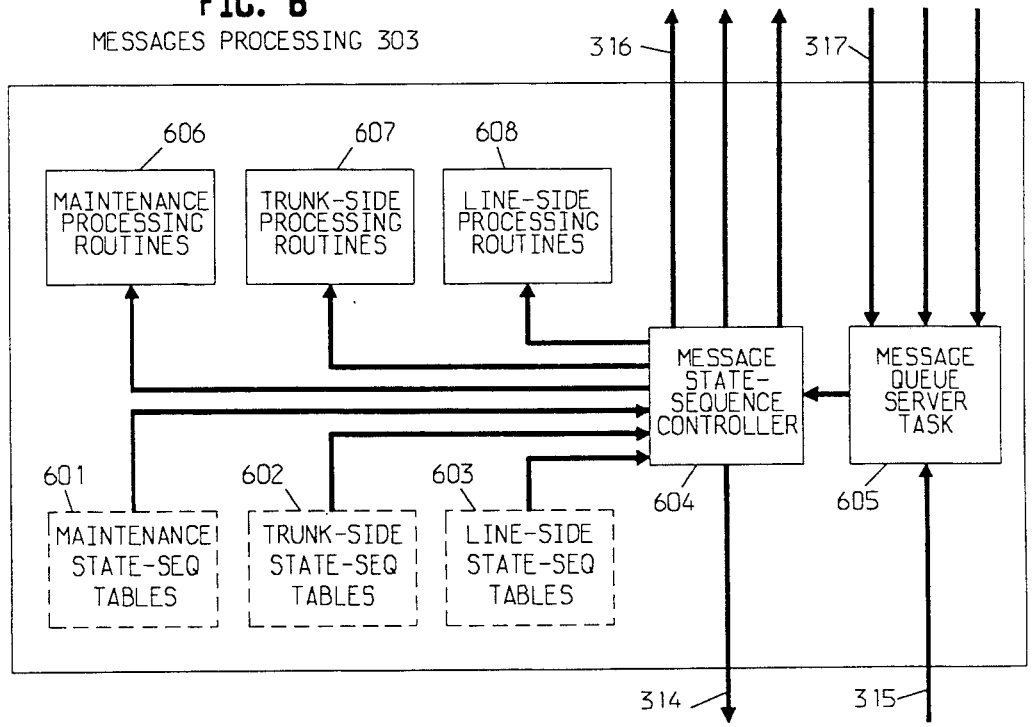
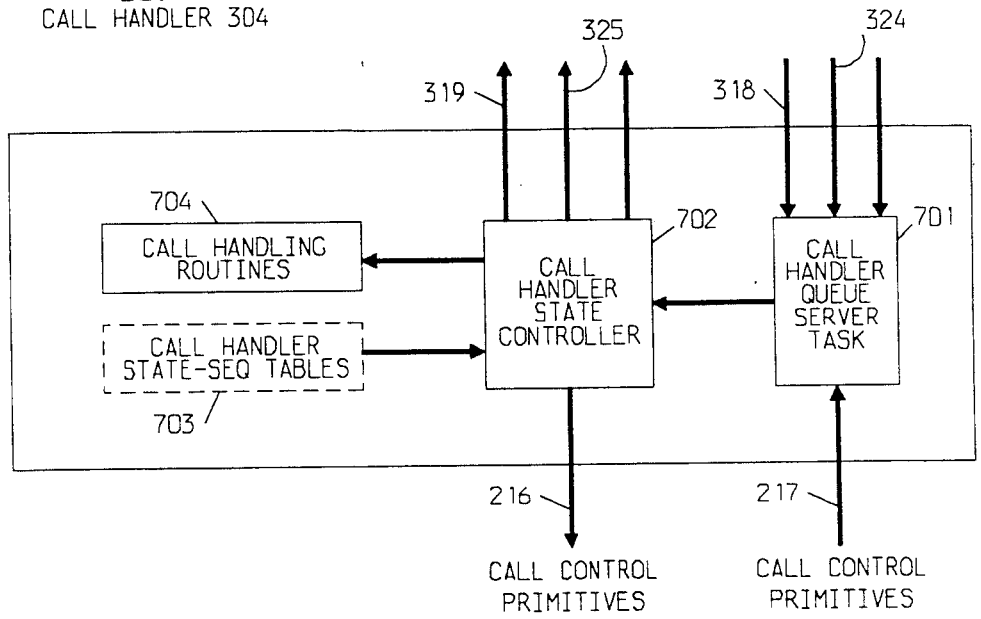

L2-L3 PRIMITIVE PROCESSING 309

RESOURCE MANAGEMENT HANDLER 311

TIMING 310

ISDN CODESET CONVERSION

REFERENCE MICROFICHE APPENDICES

This application contains microfiche appendices, designated A, B, and C, which define functions performed with respect to ISDN messages. The total number of microfiche is 4 sheets and the total number of frames is 238.

TECHNICAL FIELD

This invention relates to communication of ISDN information and, in particular, to the handling of ISDN information elements.

BACKGROUND OF THE INVENTION

ISDN standard Q.931 is intended to provide an international standard to control the flow of data and signaling information between telecommunication switching systems, packet switching systems, and terminals. That standard is an effort to establish an international set of ISDN messages with each message having a number of information elements. The message format is to group information elements by codesets and to identify each information element by a codepoint. The codeset is a term that refers to a group of 133 information element identifiers. In the ISDN message structure, there are eight possible codesets, numbered 0 through 7. Codeset 0 is the current set of information elements defined by ISDN standard Q.931. Codesets 1 through 4 are reserved for future ISDN standard Q.931 expansion. Similarly, Codeset 5 is for National use; codeset 6 is for information elements specific to the local serving network; and codeset 7 is for user-specific information elements. Information elements represent submessages within the ISDN message. The code point is an numeric value assigned to an information element. That numeric value allows identification of the information element.

Although ISDN standard Q.931 exists as a standard, it is not followed with complete compliance for the following reasons. First, from country to country, differences are found in the type of information assigned to each codeset as well as the meaning of an individual codepoint within in a given codeset due to National government regulations. Because of those differences, the usefulness of ISDN Q.931 is limited for international calls. Second, within a given country (e.g. the United States), the lack of national regulations has resulted in individual corporations creating their own standards for various codesets and codepoints. As a result, within a particular country, systems and terminals manufactured by different manufacturers may not be able to communicate with each other using all of the available codesets. Finally, there may be incompatibilities within one manufacturer's product line due to the manufacturer attempting to align his products with an evolving ISDN Q.931 standard. For example, certain corporate standards originally placed certain user-specific and local serving network information elements in codeset 7. Later, these elements were redefined as part of codeset 6 by changes to ISDN Q.931. This evolution resulted in older members of a product line being incompatible with newer members of the same product line.

Since incompatibility can exist in the codesets and codepoints, a system or terminal may receive a message which contains an unknown information element. The ISDN Q.931 standard suggest two methods for handling an unknown information element. The first method is to ignore the unknown information element completely, and the second method is to drop the call for which the unknown information element was received. The problem with these two methods is that no provision is made for incompatibilities in implementations of the ISDN Q.931 standard at the national, manufacturer, or intra-manufacturer level. What is needed is a procedure that will resolve incompatibilities at those levels.

SUMMARY OF THE INVENTION

In a telecommunication switching system, a technical advancement is achieved by an apparatus and method for automatically converting ISDN codeset and codepoint protocol in messages transmitted to the telecommunication switching system from a plurality of other telecommunication switching systems, each using a different ISDN codeset and codepoint protocol than the protocol used by the telecommunication switching system that identifies the same data information. All telecommunication switching systems are interconnected by data channels. In response to an ISDN message from one of the plurality of other telecommunication switching systems, the apparatus identifies the data channel communicating the message, indexes into a channel table using the identity of the data channel to determine the need to convert the codeset and codepoint protocol, and if needed, converts the codeset and codepoint protocol to that of the receiving telecommunication switching system.

Further, the apparatus is responsive to an ISDN message generated by the telecommunication switching system for transmission to another one of the plurality of telecommunication switching systems to identify the data channel that is to communicate the ISDN message, to index into the channel table to determine the need to convert, and if needed, to convert the codeset and codepoint protocol of the message to the codepoint and codeset protocol of the other one of the plurality of telecommunication switching systems. In addition, there are sets of conversion tables, each set identified with an ISDN data channel. The identity of the data channel is used to select which set of tables is to be used to convert the codeset and codepoint protocol. For each set of codepoint and codeset identifiers in the ISDN message, the apparatus first accesses one of the selected set of tables to determine if conversion is needed and accesses the remaining tables of the selected set to perform the conversion.

BRIEF DESCRIPTION OF THE DRAWING

FIG. 6 illustrates, in block diagram form, message processing 303 of FIG. 3;

FIG. 7 illustrates, in block diagram form, call handler 304 of FIG. 3;

DETAILED DESCRIPTION

Figure 1:
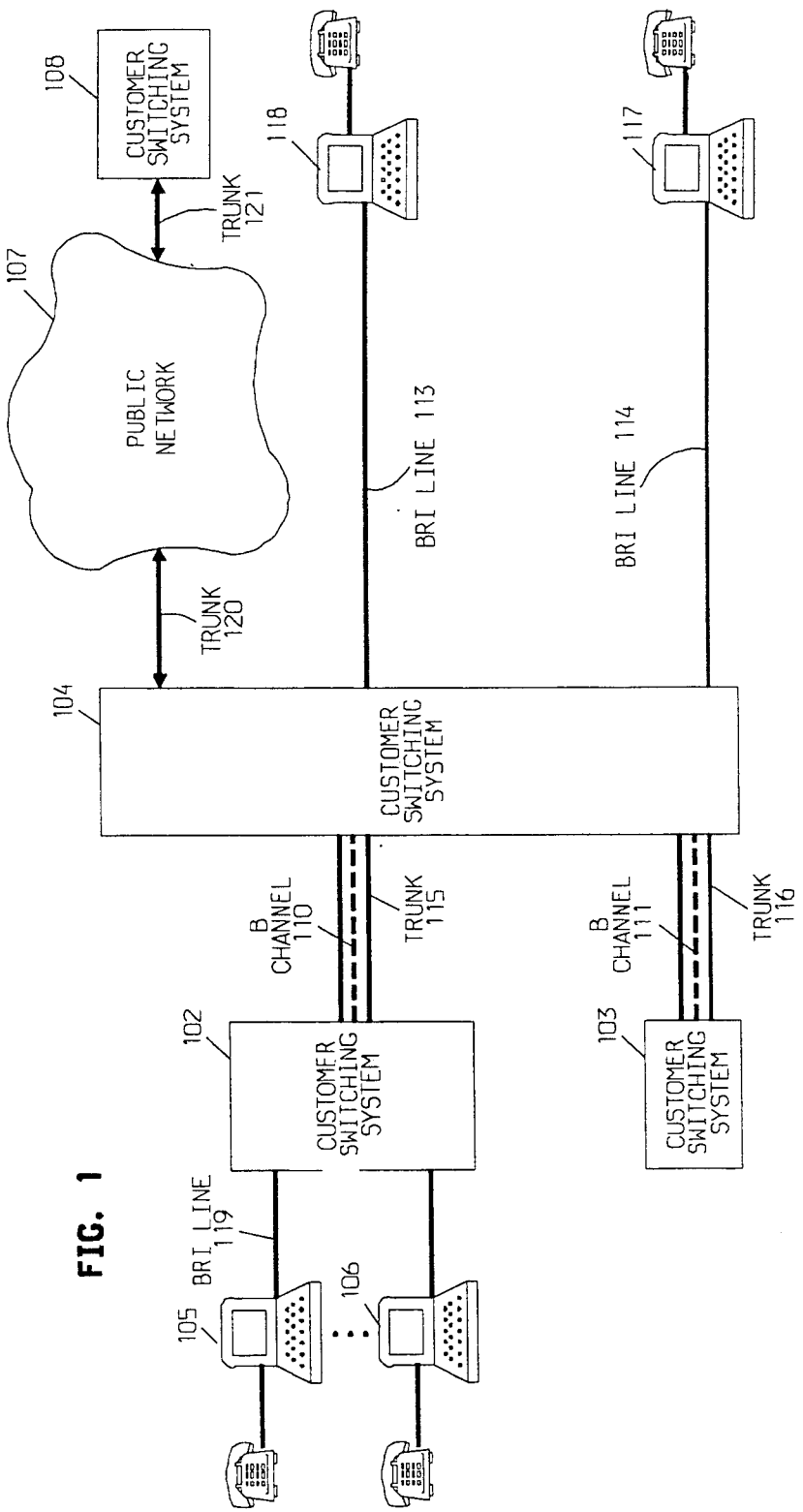
FIG. 1 illustrates, in block diagram form, a system embodying the inventive concept.

In FIG. 1, customer switching systems 102, 103, and 104 are physically interconnected by ISDN primary rate interface (PRI) trunks (also referred to as communication links) each having advantageously 23 bearer channels (B channels) and 1 control channel (D-channel). Customer switching systems are also referred to as PBXs or PABXs. Each channel has a transmission capacity of 64 Kbs. Terminals 105, 106, 117, and 118 are physically interconnected to the switches by ISDN basic rate interface (BRI) lines, each having two 64 Kbs channels and a 16 Kbs control channel.

Figure 20:
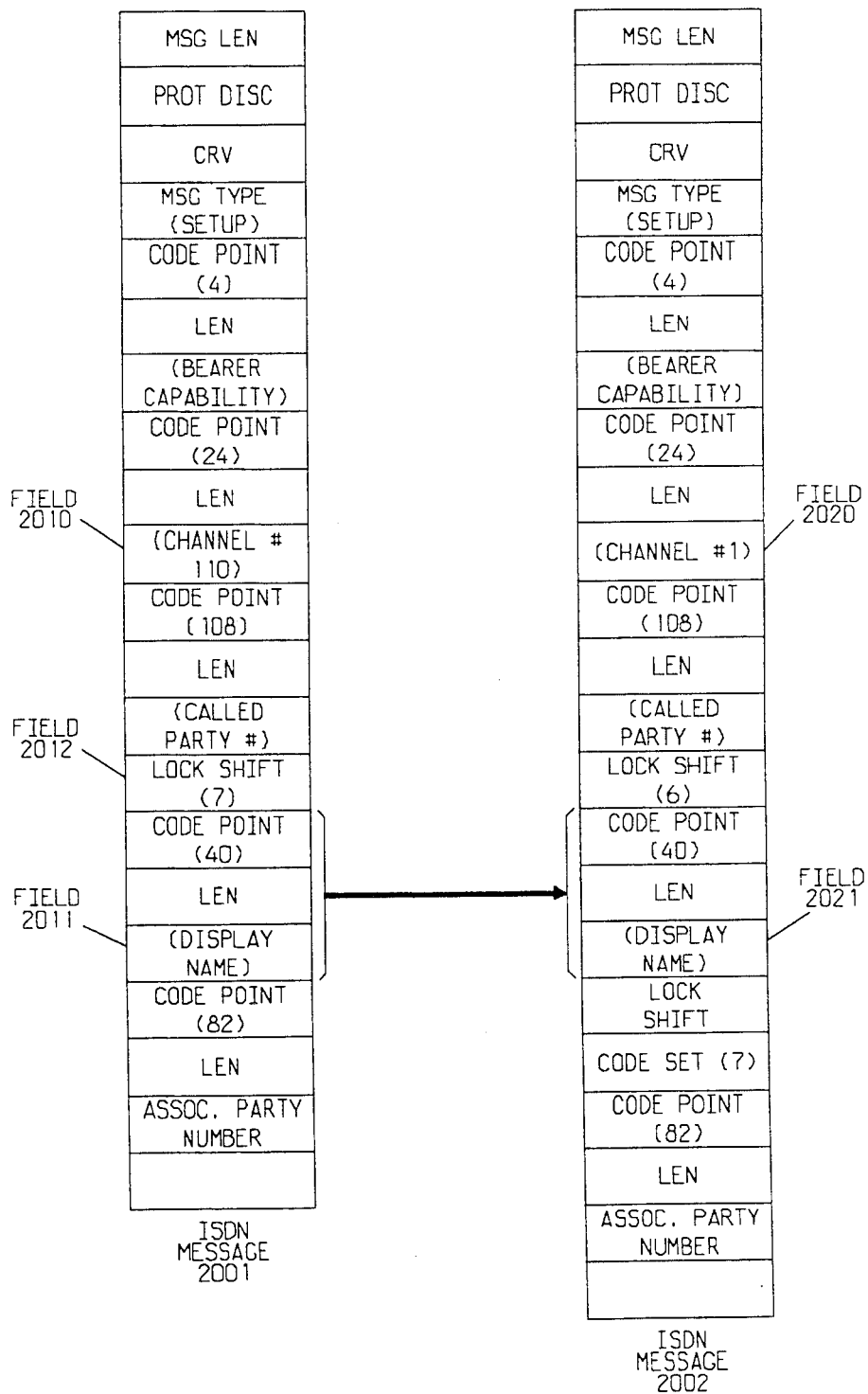
FIG. 20 illustrates the conversion of an incoming ISDN message to an outgoing ISDN message.

Consider the following illustrative example which is in accordance with the invention. During the origination of the call, customer switching system 104 establishs an ISDN connection between BRI terminal 118 and BRI terminal 105 via BRI line 113, channel 110 of trunk 115, customer switching system 102, and BRI line 119 using a call setup message. Customer switching system 104 is a different vintage PBX than customer switching system 102 and uses a different set of codeset and codepoint identifiers (also referred to as codeset and codepoint protocol) which is defined in Table 1. The set of codeset and codepoint identifiers for customer switching system 102 is given in Table 2. (Tables 1 and 2 are at the end of Detailed Description section.) As part of call origination, customer switching system 102 transmits to customer switching system 104, via the D channel of trunk 115, ISDN message 2001 of FIG. 20. Message 2001 includes the channel number IE (codeset 0, codepoint 24) defining that B channel 110 (field 2010) is to be the communication path and the display IE (codeset 7, codepoint 40) containing the alphanumeric name of the person (field 2011) assigned to originating BRI terminal 105. As illustrated in FIG. 20, customer switching system 102 transmits the display IE in codeset 7 as codepoint 40 (field 2011), but customer switching system 104 expects that the display IE will arrive in codeset 6 as codepoint 40 (field 2020) as illustrated by ISDN message 2002. Lock shift field 2012 defines that the codeset has changed from codeset 0 to codeset 7.

Upon receipt of message 2001, customer switching system 104 recognizes that the message arrived from trunk 115. System administration had previously marked trunk 115 as requiring message conversion, and customer switching system 104 converts the codepoint 40 in codeset 7 to codepoint 40 in codeset 6. Customer switching system 104 forms an internal message similar to message 2002. Initially, customer switching system 104 forms this message so as to properly verify message 2001 since the internal software structure assumes that every received message is of the set of identifiers defined in Table 1. Since BRI terminal 118 utilizes the same standard as customer switching system 102, customer switching system 104 converts the codepoint and codeset back to the origial values before transmitting the message on BRI line 113 to BRI terminal 118. The message transmitted to BRI terminal 118 is similar to message 2001 except that the field corresponding to field 2010 defines a B channel on BRI line 113. If the message was transmitted to BRI terminal 117 which utilizes the same set of identifiers as customer switching system 104, there would be no need to convert the set of identifiers. Customer switching system 104 would transmit a message similar to message 2002 to BRI terminal 117 except the channel number field would identify a B channel in BRI line 114. As explained in greater detail with respect to FIGS. 15 through 19, customer switching system 104 utilizes internal tables which are administered by a system administrator to determine which trunks or BRI lines must be converted and what that conversion should be.

As illustrated in FIG. 1, customer switching system 104 is connected to public network 107 via trunk 120. Public network 107 could be a continental network or an international network in which case customer switching system 108 would be in a foreign country and operate on a different version of the ISDN standard. Customer switching system 104 could serve as a gateway for customer switching systems 102 and 103 as well as BRI terminals 118 and 117 by translating the standard implemented by customer switching system 108 to a standard recognizable by the equipment interconnected to customer switching system 104. In addition, customer switching system 104 is capable of converting any of the codepoints and codesets as deemed necessary by the system administrator of customer switching system 104 and is not limited to present dispiay IE example.

Figure 2:
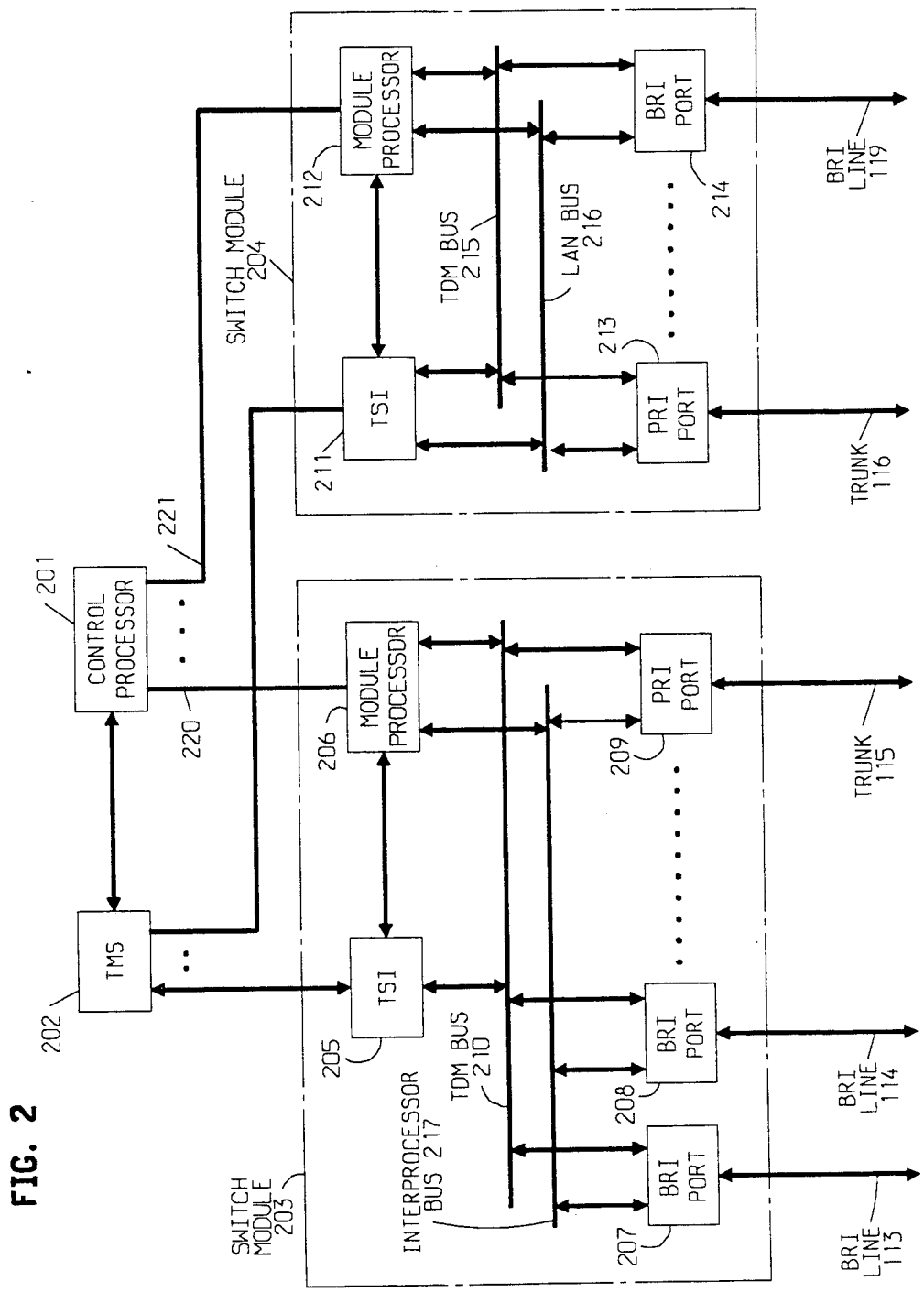
FIG. 2 illustrates a business communication system for practicing the invention.

Customer switching system 104 is illustrated in greater detail in FIG. 2. Customer switching system 104 comprises switch modules 203 and 204, time matrix switch (TMS) 202 and control processor 201. Each switch module is illustrated as terminating a plurality of ISDN PRI trunks or BRI lines. Each switch module routes all intra-module calls within itself; whereas, inter-module calls must be routed through TMS 202.

The data received from the PRI trunks within switch module 203 is interconnected via time division multiplex (TDM) bus 210 with each channel being assigned a time slot for receiving data and a time slot for transmitting data on bus 210 and all time slots are switched through time slot interchange (TSI) 205. The functions performed by TDM 210, TSI 205 and TMS 202 are well-known in the art.

Switch module 204 functions in a different manner than switch module 203. Channels communicated within switch module 204 do not have to be switched through TSI 211 but can be switched directly on TDM bus 215. TSI 211 is only used for inter-module calls.

The ISDN messages are transmitted via the PRI trunks in a D-channel which is the 24th channel of each trunk. Within switch module 203, the messages associated with logical channel 110 are received via the 24th channel of trunk 115 and are terminated at ISDN level 2 by PRI port 209. Interlevel communication messages designated as L2-L3 primitive are then transferred via interprocessor bus 217 to module processor 206. ISDN messages associated with logical channel 111 are communicated in the 24th channel of trunk 116. These messages are transferred via LAN bus 216 to module processor 212. LAN bus 216 is not used for packet switching. The latter processor terminates level 2 before transferring the L2-L3 primitive messages via datalink 221 to control processor 210.

Customer switching system 104 can also terminate a variety of standard analog telephones and trunks and also digital telephones and terminals utilizing the AT&T DCP protocol. Such telephones and terminals are not illustrated in FIG. 2.

Figure 3:
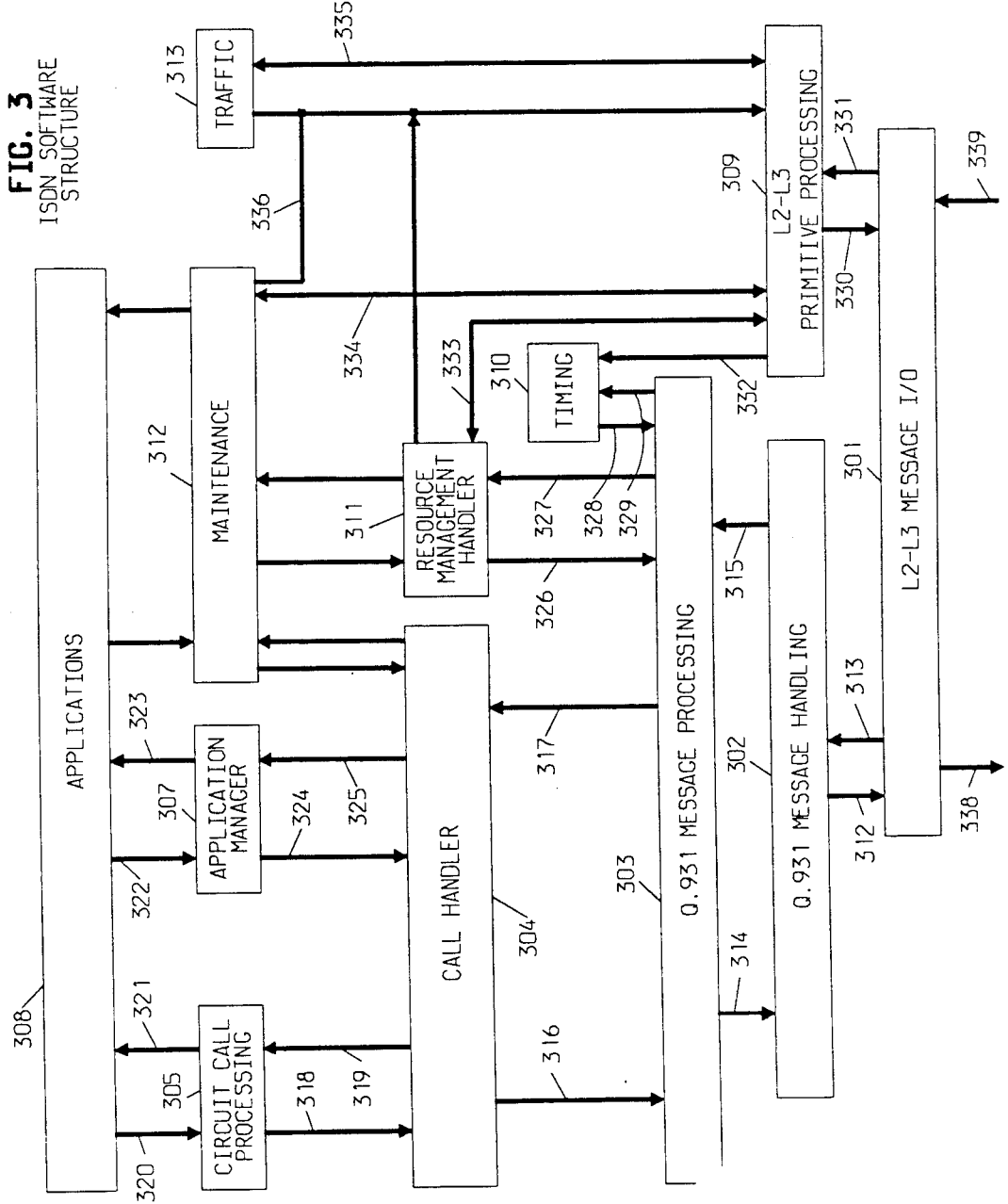
FIG. 3 illustrates the ISDN software structure used to control the system of FIG. 2.
Figure 11:
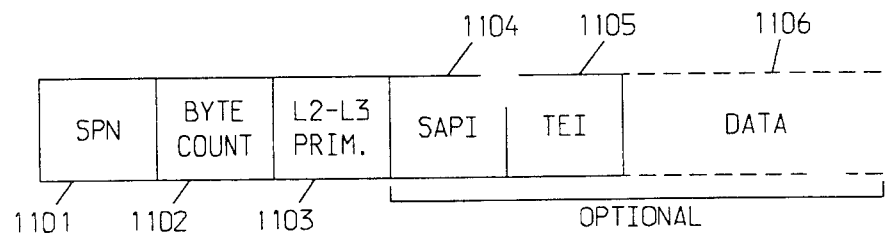
FIG. 11 illustrates the format of L2-L3 primitive packets.

FIG. 3 illustrates the ISDN software structure that is implemented by control processor 201. The non-ISDN functions performed by control processor 210 and low-level functions performed by the module processors are not shown; however, circuit call processing block 305 and maintenance block 312, which are executed by control processor 201, include the call processing and maintenance for the non-ISDN functions. In general, blocks 304 through 306 are concerned with the management of voice and data calls whereas blocks 309 through 313 are concerned with the maintenance and resource management tasks. Blocks 307 and 308 are utilized by high level applications. The software architecture of FIG. 3 receives messages which are transmitted from level two via input and output paths 338 and 339. The format of these messages is illustrated in FIG. 11, and further details on level two and level three messages may be found in AT&T Technical Publication Number 41449 and Addendum 41459. L2-L3 message I/O block 301 receives information from path 311. The primitives on paths 338 and 339 are defined by field 1103 of FIG. 11. Microfiche Appendix A gives further details on these primitives. Block 301 is responsible for handling all L2-L3 information to and from a module. After handling these messages, block 301 transfers all of the received L2-L3 primitives that indicate a Q.931 message, which is the DL_DATA_INDICATION, to Q.931 message handling block 302 for processing. All other L2-L3 primitives received by block 301 are transferred to block 309 for processing.

Q.931 message handling block 302 is responsible for verifying and creating all Q.931 messages. Block 302 interfaces with L2-L3 message I/O 301 by receiving and sending all of the DL_DATA_INDICATION primitives which contain incoming or outgoing Q.931 messages. Q.931 message handling communicates with Q.931 message processing 303 by passing either a verified Q.931 message or receiving a request to build a Q.931 message.

Q.931 message processing 303 provides the control of the Q.931 operation and does this by maintaining state tables which define the state of the Q.931 message protocol for each Q.931 channel which has been established or is being established within any module of system 200 of FIG. 2. Q.931 message processing 303 negotiates the establishment of Q.931 channels, supervises their activity and eventually releases them. Block 303 communicates with call handler 304, resource management handler 311, and timing block 310.

Call handler 304 is utilized to provide an interface for the Q.931 message being communicated between block 303 and circuit call processing 305, multilink 306, application manager 307, and maintenance 312. Circuit call processing 305 is responsive to analog telephone and trunk like stimulus to provide the overall call processing functions. Call handler 304 is responsive to the Q.931 message processing 303 to convert the Q.931 messages into analog telephone and trunk like stimulus to be passed to circuit call processing block 305.

Timing block 310 provides all the necessary software timers for block 303. Resource management handler 311 is responsible for controlling the service status of circuits and the link status of level two. Maintenance 312 performs the normal maintenance type tasks for the ISDN portion of system 104. Traffic block 313 performs the standard traffic measurement type functions.

Figure 4:
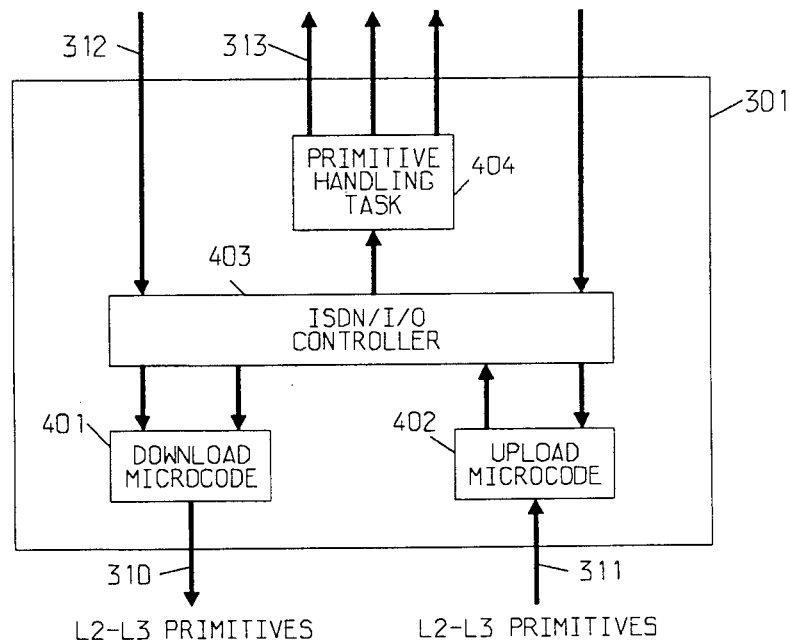
FIG. 4 illustrates, in block diagram form, L2-L3 message I/O 301 of FIG. 3.

L2-L3 message I/O block 301 is illustrated in greater detail in FIG. 4. ISDN I/O controller block 403 is a task which runs every ten milliseconds on control processor 201 and is responsible for moving all of the ISDN information in and out of control processor 201. Controller 403 functions by calling microcode routines 401 and 402 to move information into and out of a queue of input message buffers and a queue of output message buffers, respectively. The input into controller 403 is an L2-L3 primitive, DL_DATA_REQUEST primitive, received from message handling block 302 via path 312. This primitive is passed to controller 403 along with a message buffer. All messages received from level two by block 301 are passed from controller 403 to primitive handling task 404. Primitive handling task 404 is also run every ten milliseconds and is used to process all of the L2-L3 primitives. Primitive handling task 404 handles these primitives in one of two ways. Either control is passed to a routine specified for that primitive in blocks 302 or 309 which is done for primitives requiring immediate attention or the primitive and information related to the primitive are stored in a specific queue for that primitive for later execution. Subsequently, the queue is passed to block 309. The storing of the primitive and related information is done for tasks which may be performed at a later time. Such tasks include maintenance and traffic type operations. When primitive handling task 404 directly passes control to a routine, for example in message handling block 302 to process a primitive, it is passing control of control processor 201 and that control is returned by the receiving routine to primitive handling task 404 once the routine has finished executing.

Figure 5:
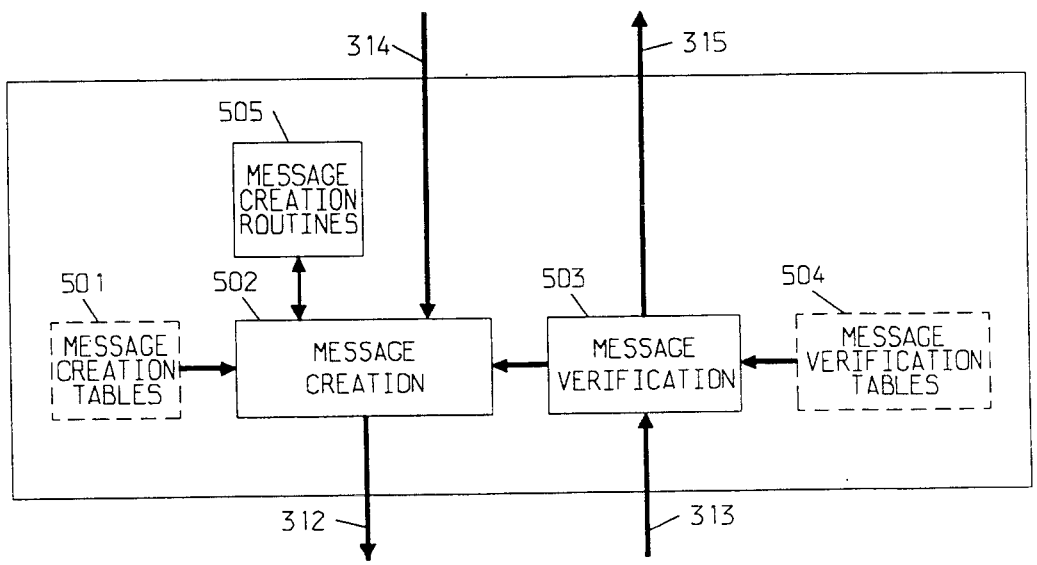
FIG. 5 illustrates, in block diagram form, Q.931 message handling 302 of FIG. 3.

Turning now to FIG. 5, it will be recalled that Q.931 message handling block 302 is responsible for verifying and creating all Q.931 messages. Block 302 interfaces with message I/O block 301 via paths 312 and 313 by receiving DL_DATA_INDICATION and sending DL_DATA_REQUEST primitives containing an incoming or outgoing Q.931 message, respectively. Block 302 communicates with Q.931 message processing block 303 via paths 314 and 315 by passing either a verified Q.931 message or receiving a request to build a Q.931 message. Message verification block 503 receives control from message I/O block 301 when a Q.931 message has been received and needs to be verified. Block 503 parses the message and checks for any message format error and verifies that all the mandatory information is included based on the specifications as published in the aforementioned AT&T Technical Publication. All of the information needed to check the received message is contained in message verification tables 504. The message is parsed by storing pointers into the buffer containing the message that point to the different types of information in the message. In particular, block 503, using information from tables 504, performs the codeset and codepoint conversion for incoming messages which is the subject of this invention. Further details with respect to that conversion are given in the discussion of FIGS. 15 through 19. Messages that are successfully parsed are passed to message processing block 303 via path 315. Message verification block 503 is responsive to two different types of errors in received messages. Certain types of errors are simply logged in a general area utilized to log errors which will be processed later if necessary. Such errors would result, for example, if a message came that was simply incomplete. The other type of message error is where the message is complete but specifies a logical entity that did not exist, for example, referring to a call that does not exist. Such an error requires an immediate response, and message verification block 503 transmits a request to message creation block 502 to transmit a message to the sender of the message in error giving the status of the received message and a code specifying what the error was.

Message creation block 502 receives requests to build a message from either message verification block 503 or Q.931 message processing block 303. Block 502 provides the control for properly creating a message. All of the information elements included in a message are created by individual routines contained in message creation routines block 505. In particular, blocks 502 and 505, using information from tables 501, perform the codeset and codepoint conversion for outgoing messages which is the subject of this invention. Further details with respect to that conversion are given in the discussion of FIGS. 14 through 19. Information for building each type of message is contained in message creation tables 501. Message creation block 502 builds a requested message by generating the proper message information using the routines in message creation routines block 505. Each of these routines is invoked by block 502 for a specific information element (IE), and each IE routine contains all of the information on whether an IE should be created for a given situation and all of the rules on what information goes in the IE.

Q.931 message processing block 303 is illustrated in greater detail in FIG. 6. Block 303 is responsible for allowing system 104 to communicate with other data equipment at the peer level of Q.931 and is responsible for such functions as establishing peer type communication at Q.931, maintaining this communication, and releasing such communication when necessary. Message processing block 303 also maintains a set of tables which define the status, call type, and used facility for all level 3 links for both circuit and data calls.

The processing performed by block 303 is classified as maintenance processing, trunk-side processing, or line-side processing. The trunk-side and line-side processing are used to map call stimulus received in Q.931 messages into the call control message which can be used by circuit call processing block 305. The maintenance processing is used to handle all messages that apply to the "null" or "global" call reference values for both lines and trunks. A "null" reference value indicates that the message is not associated with any call. Whereas, a "global" reference value indicates it is associated with all calls on the receiving BRI or PRI interface.

Message queue server task 605 is a task which is run every ten milliseconds on each module processor and checks to see if there is any work for block 303 in the form of incoming messages from blocks 304, 311, or 310. The incoming messages are left in message queues by the latter blocks. In addition, it looks for messages coming from Q.931 message handling block 302. Queue server task 605 is responsive to those messages to interpret the work to be done and to convert that work into state-stimulus information and to determine the state table and specific call record to which the work applies. After doing that, message queue server task 605 then activates message state sequence controller 604 to process the state and stimulus information using routines 606, 607, and 608 with the state-sequence information coming from tables 601, 602, and 603. The processed information is transferred to blocks 302, 304, 310, or 311 in message queues. Microfiche Appendix B, section 8 defines, in greater detail, the functions performed by maintenance processing routines 606 and maintenance state-sequence tables 601. Section 5 of microfiche Appendix B defines, in greater detail, the functions performed by trunk-side processing routines 607 and trunk-side state-sequence tables 602. Microfiche Appendix C defines, in greater detail, the functions of line-side processing routines 608 and line-side state-sequence tables 603.

Call handler 304 is illustrated in greater detail in FIG. 7. Call handler queue server task 701 interrogates one of two queues for work. One queue is for messages from the Q.931 layer which are received from block 303, and the second queue is for higher layers which are blocks 305, 306, 307, and 312. If work is found in either of these queues, block 701 transfers the information along with the stimulus to call handler state controller 702. Controller 702 classifies the stimulus and information as being a maintenance or call type. Controller 702 sends the maintenance type which are restart requests and responses to maintenance block 312 for processing.

Calls are divided into four categories trunk, line, multilink, and non-switched. Calls are identified as being in one of these categories based on the contents of the call record tables maintained by message processing block 303. If a call is the only call associated with a channel, it is assumed to be an ordinary telephone call or standard circuit switched call. If a call is one of plurality of calls on a channel, it is assumed to be a multilink call. If a call is not assigned to a channel, it is assumed to be a non-switched call. Controller 702 processes each of these by using a separate set of state tables.

Standard circuit switched calls are processed to map the stimulus into the analog telephone and trunk format used by circuit call processing block 305, and that processed stimulus is then transferred to block 305. The multilink stimulus is processed and transferred to multilink block 306. The non-switched stimulus is processed and transferred to application manager 307 via path 325.

Circuit call processing block 305 is a well known circuit switched call processing as performed by customer communication switching systems. An example of such a system is the AT&T System 85.

Figure 8:
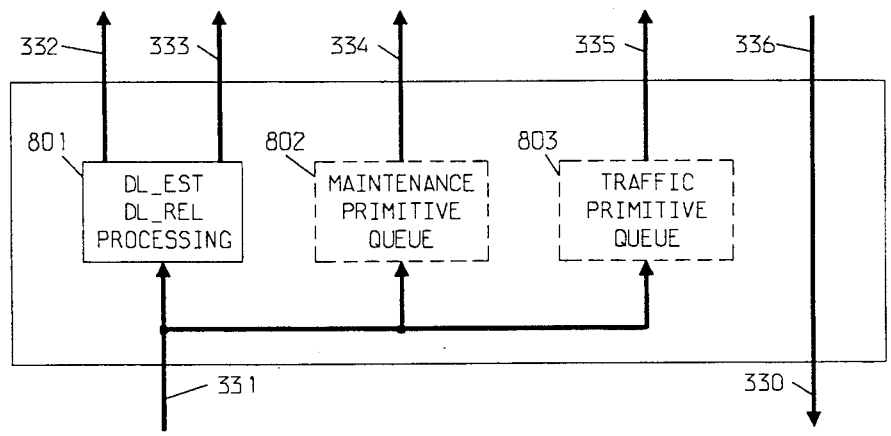
FIG. 8 illustrates, in block diagram form, L2-L3 primitive processing 309 of FIG. 3.

L2-L3 primitive processing block 309 is illustrated in greater detail in FIG. 8. If the information concerns the establishment or the release of a link, then block 301 causes routine 801 to process this information immediately and transmit the necessary stimulus to timing block 310 via path 332 and to resource management handler 311 via path 333. The reason for this quick response is that this information has to be acted on promptly by both resource management handler 311 and timing 310 in order to prevent disruption of system operation. If the primitive is destined to go to maintenance 312 or traffic 213, then this information can simply be placed in maintenance primitive queue 802 or traffic primitive queue 803, respectively, until the appropriate block can access this information and utilize it. All L2-L3 primitives coming from maintenance 312, resource management handler 311, or traffic 313 are transferred directly through block 309 to block 301 via paths 336 and 330.

Figure 9:
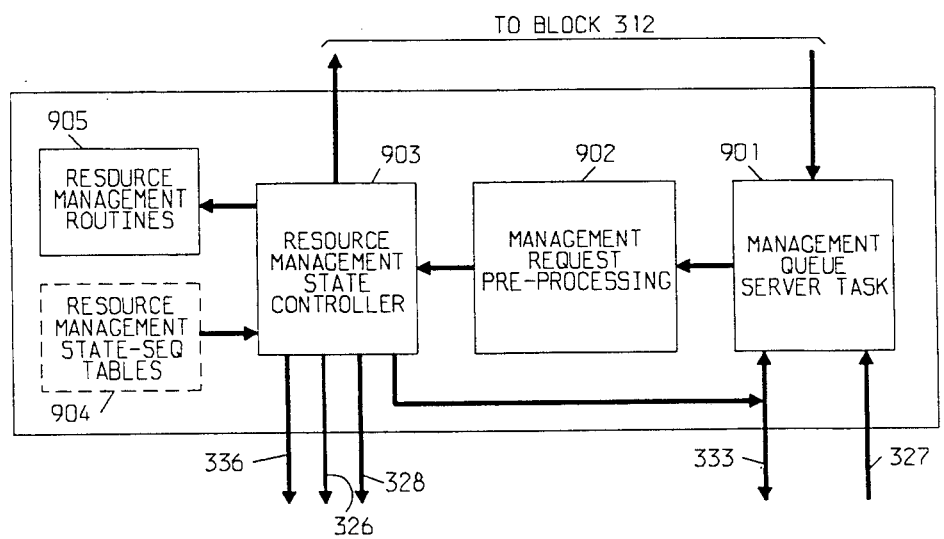
FIG. 9 illustrates, in block diagram form, resource management 311 of FIG. 3.

Resource management handler 311 is illustrated in greater detail in FIG. 9. Management queue server task 901 receives all information sent to block 311. Block 901 accepts either management requests from Q.931 message processing 303, via path 327, establish or release indications from L2-L3 primitive processing 309, or busy-out request from maintenance 312. Management queue server task 901 takes these requests and transfers them to management request preprocessing 902. The latter block determines the specific work to be done and turns the request into a stimulus that can be applied against state table 904 to determine the required actions in the form of a stimulus.

After accomplishing those functions, management request preprocessor 902 transfers the required stimulus to resource management state controller 903. Controller 903 is responsive to the stimulus to use resource management state-sequence tables 904 and resource management routines 905 to process the stimulus. The output from controller 903 is either busy-out requests/responses passed to maintenance 312 or management primitives requesting that information be sent to the other side of the Q.931 interface. These management primitives are transmitted to Q.931 message processing 303 via path 327 if they refer to call information, otherwise they are transferred via L2-L3 primitive processing 309 via path 333.

Figure 10:
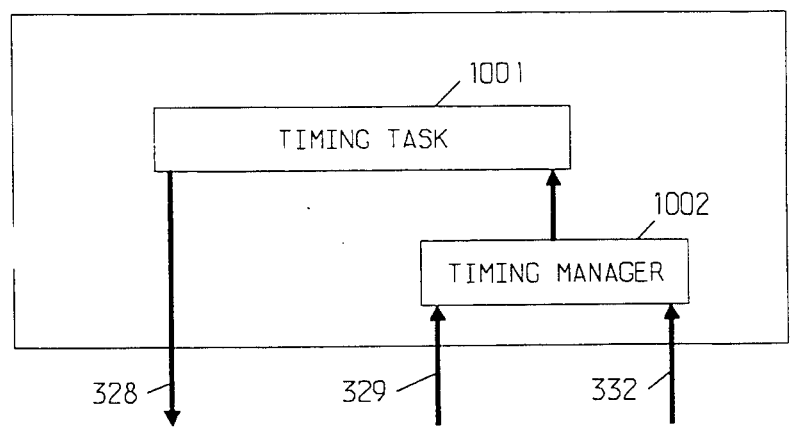
FIG. 10 illustrates, in block diagram form, timing 310 of FIG. 3.

FIG. 10 illustrates, in greater detail, timing 310. Timing 310 provides all of the timing for the Q.931 level messages and is responsive to two different types of requests. First, Q.931 message processing 303 uses timing 310 to enforce the various time intervals necessary for the Q.931 message states via paths 328 and 329. Second, timing 310 is responsive to the establishment and release primitives detected by L2-L3 primitive processing 309 to start the timer running so as to determine whether or not a link has been released or established within the proper time. If the necessary actions are not performed in the correct time interval, timing 310 then informs block 303, and the latter block takes the required actions. All requests to block 310 are received by timing manager 1002 via paths 329 and 332. Timing manager 1002 sets the necessary timing information in status memory to reflect what timers should be running. Timing task 1001 is executed every 100 milliseconds to determine when a timer expires. When a timer expires, timing task 1001 creates a timer expiration primitive and places it in a primitive queue for Q.931 message processing 303. Q.931 message processing 303 may in response to the timer expiration primitive transfer a message to resource management handler 311 via path 327.

FIG. 11 illustrates the format of the L2-L3 primitive packets. Field 1101 is used to communicate the scanner port number, and field 1102 contains the number of bytes in the packet. Field 1103 contains the L2-L3 primitive type as defined in Microfiche Appendix A. Field 1106 contains the necessary data. Fields 1104 and 1105 are the service access point identifier and terminal end point identifier, respectively. The terminal end point identifier allows for the specification of more than one end point for the message. The service access point identifier allows for more than one logical entity to be associated with a terminal end point identifier. More information concerning these fields can be found in the above referenced AT&T Technical Publication.

Figure 12:
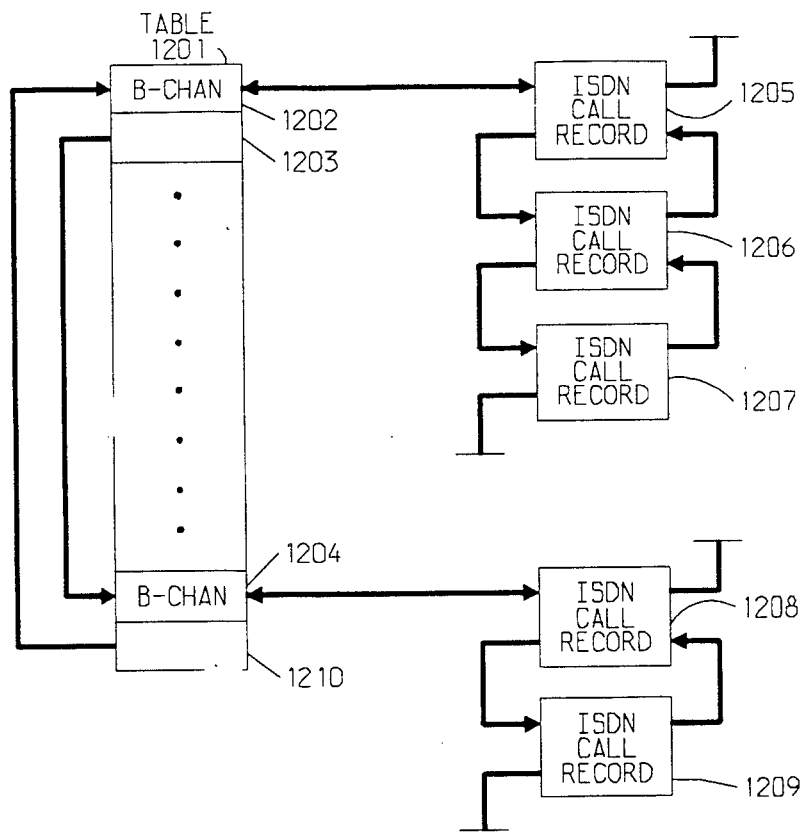
FIG. 12 illustrates, in block diagram form, linked ISDN call records.

FIG. 12 illustrates the table maintained by message processing block 303 which defines the level 3 links currently interconnected to a given module. Table 1201 has two entries for each B-channel in the system. The first entry in table 1201 points to a linked list of ISDN call records, and the second entry points to a second connected B-channel if the first B-channel is active. For example, entry 1202 points to the ISDN call record list that consists of records 1205, 1206, and 1207. The second entry, entry 1203, points to entries 1204 and 1210 which are associated with the connected B-channel. In the case where the B-channel was being utilized for only one switched call, the entry in table 1201 would only point to one ISDN call record. In the case illustrated by entry 1202, there are three associated ISDN call records; and these represent a multilink utilization of the channel associated with entries 1202 and 1203 of table 1201.

Figure 13:
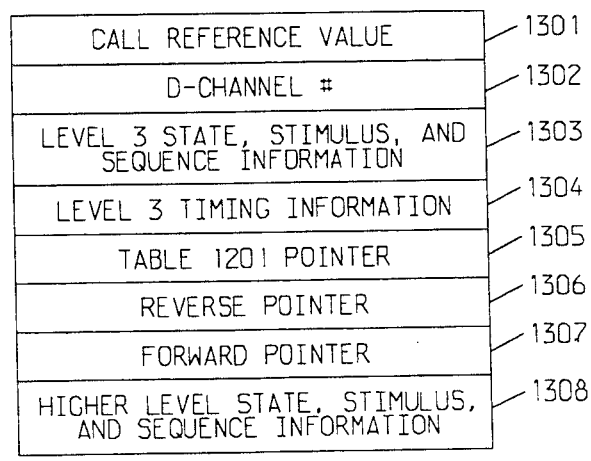
FIG. 13 illustrates the layout of a ISDN call record.

The structure of the ISDN call records is illustrated in greater detail in FIG. 13. Call reference value 1301 defines the number which is used to identify the data call between customer switching system 104 and another switch. D-channel number 1302 contains a pointer which points to the physical record of the D-channel which communicates signaling for the logical link assigned to the call record. Section 1303 of the call record defines the level 3 state, stimulus, and sequence information which is utilized by message processing block 303 of FIG. 3 to implement the level 3 protocol. Section 1304 contains the timers used at level 3 and the stimulus to be given when a timer times out. Section 1305 contains a pointer which points back to table 1201 from the call record in FIG. 12. Sections 1306 and 1307 are utilized to link a call record with other call records on the same logical channel. Section 1308 contains the high level state, stimulus, and sequence information which is utilized by blocks 304, and 306 in processing calls.

Figure 14:
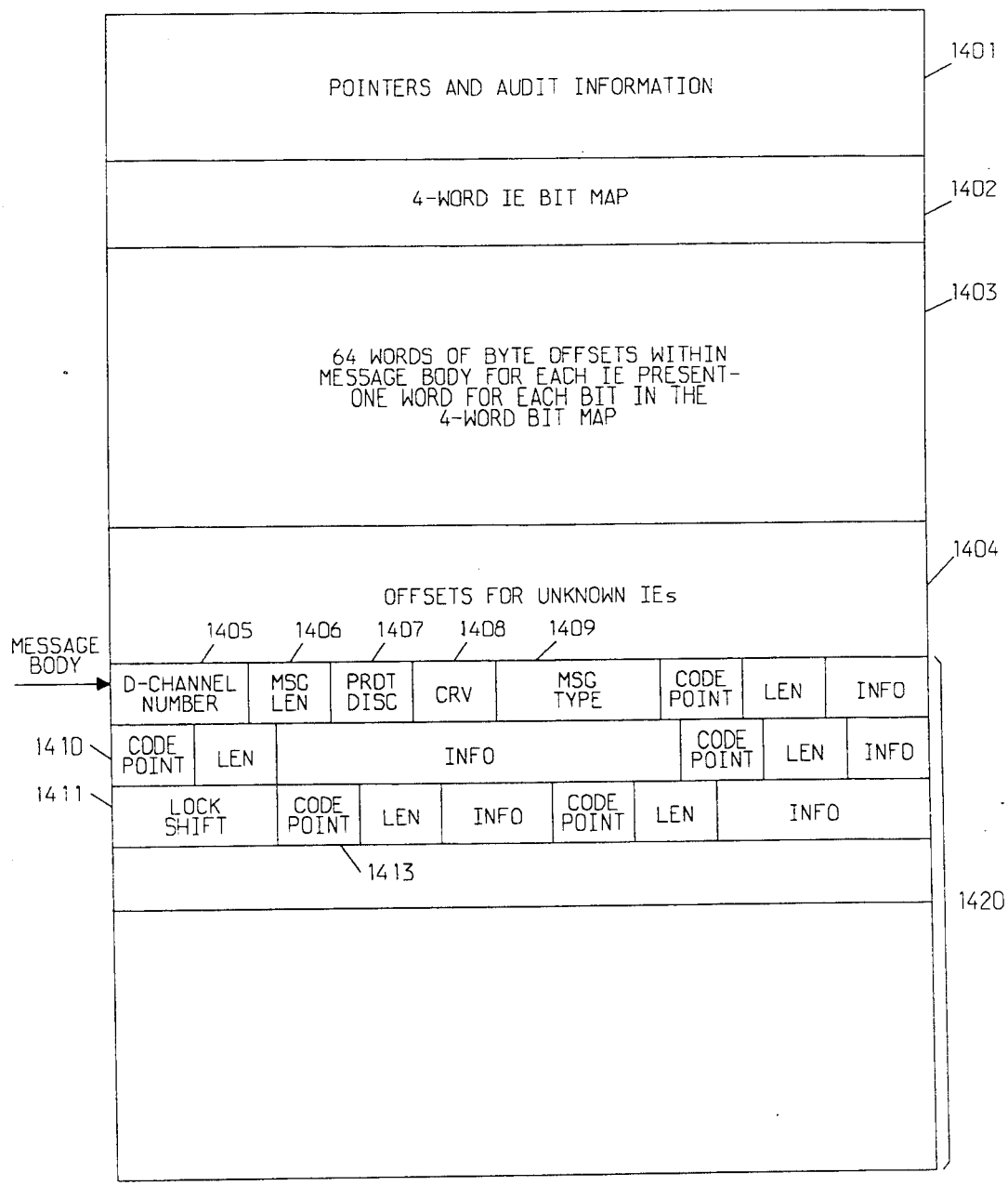
FIG. 14 illustrates the format of a level 3 ISDN message.
Figure 15:
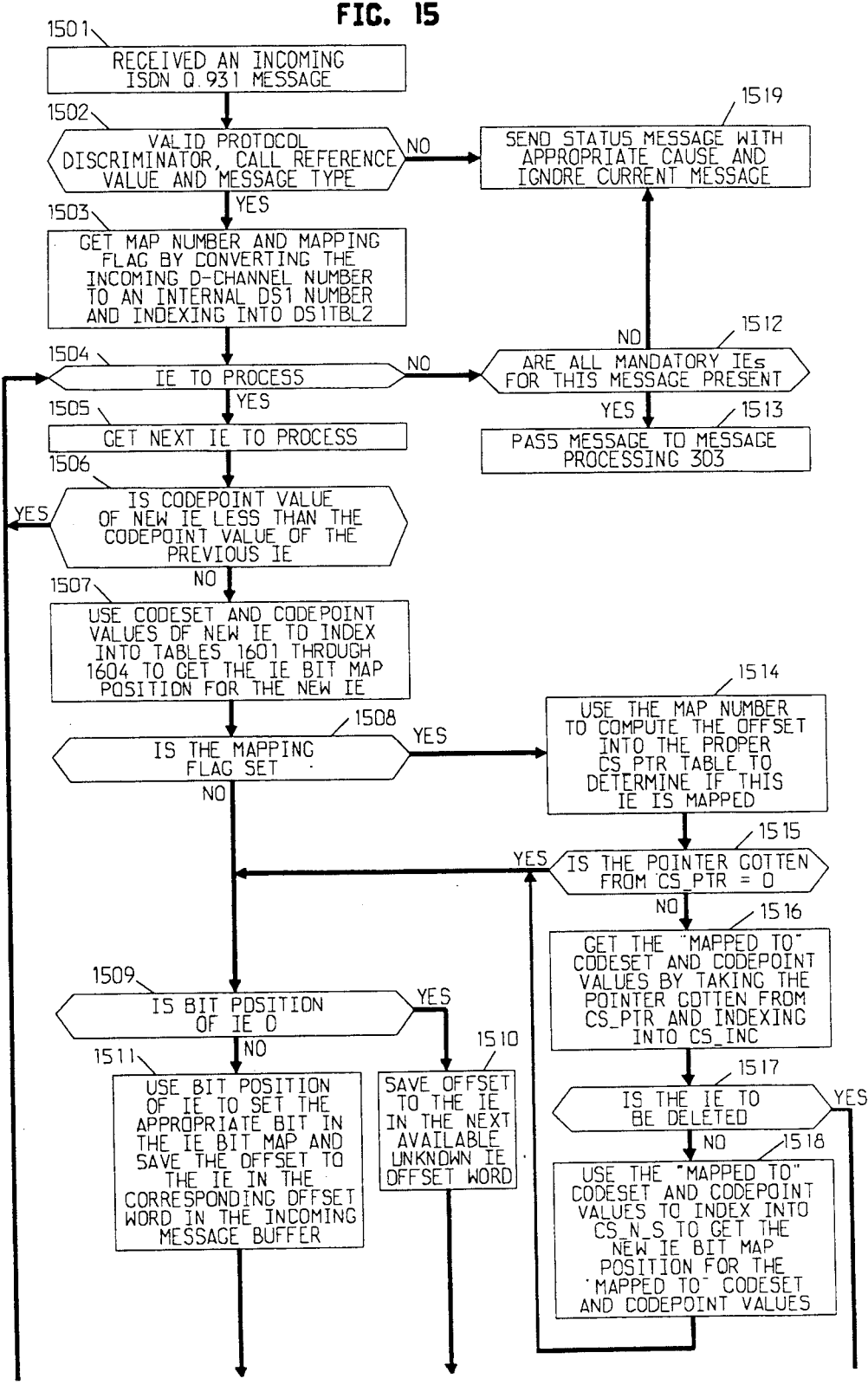
FIG. 15 illustrates, in flow chart form, message verification operations.

FIG. 15 illustrates in greater detail the operation of message verification block 503 of FIG. 5 in accordance with invention. Section 1420 of FIG. 14 illustrates a received message which is similar to message 2001 of FIG. 20. The operations of FIG. 15 attempt to construct blocks 1402, 1403 and 1404 of FIG. 14. Map 1402 is of particular importance because customer switching system 104 is presently limited to recognizing only 64 codepoints for all 8 codesets. Each word in map 1402 consists of 16 bits. Each bit of map 1402 represents a particular codepoint (which communication switching system 104 internally recognizes as being in a particular codeset). Map 1402 is important because it is interpreted by higher levels of FIG. 3 to have particular meanings and helps these levels interpret the message. Section 1403 of FIG. 14 consists of 64 words of bit offsets each corresponding to one of the bits in map 1402. These offsets align the information of the IEs with the converted codepoint which is stored in map 1402.

Figure 16:
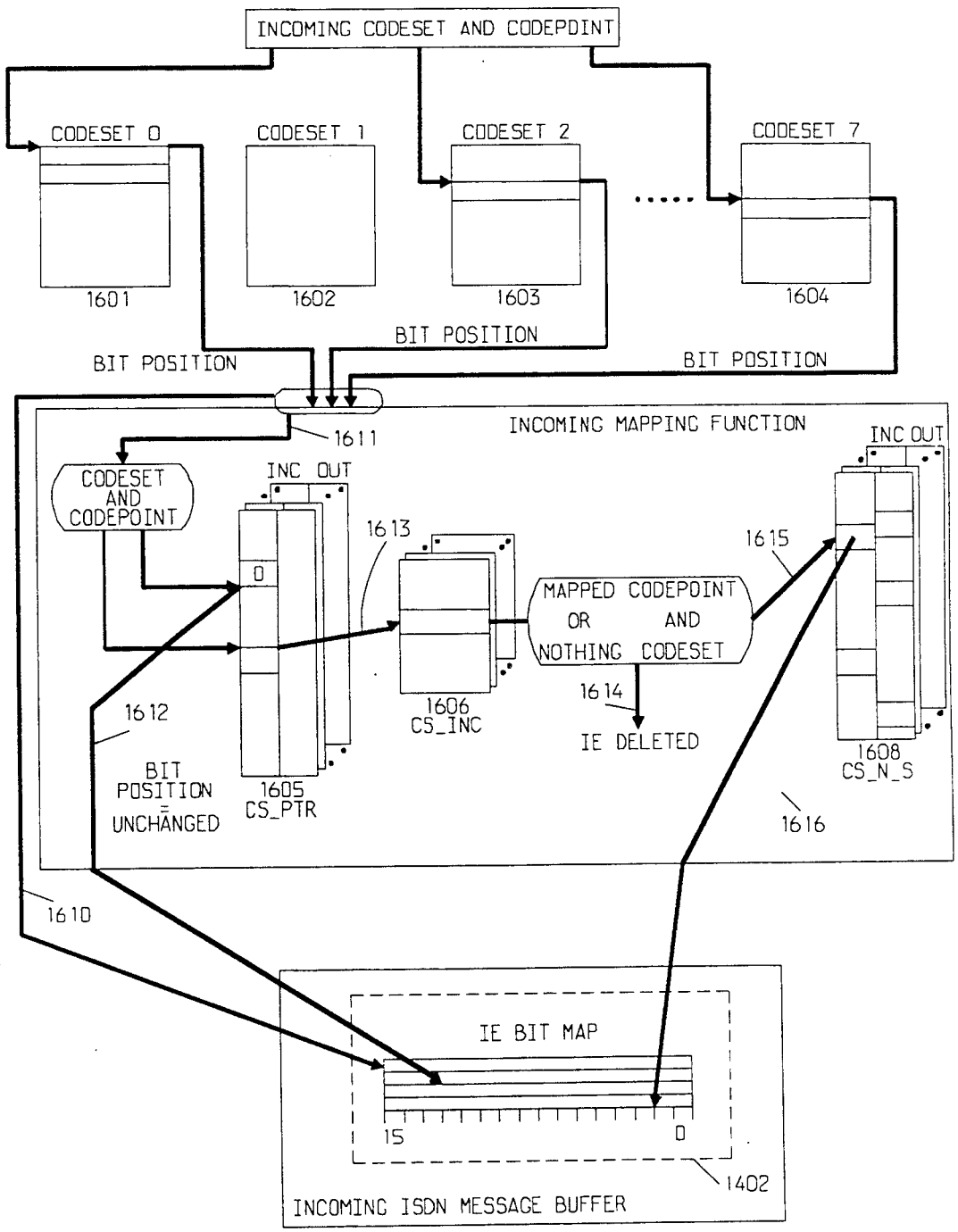
FIG. 16 illustrates tables used by the message verification operations.
Figure 17:
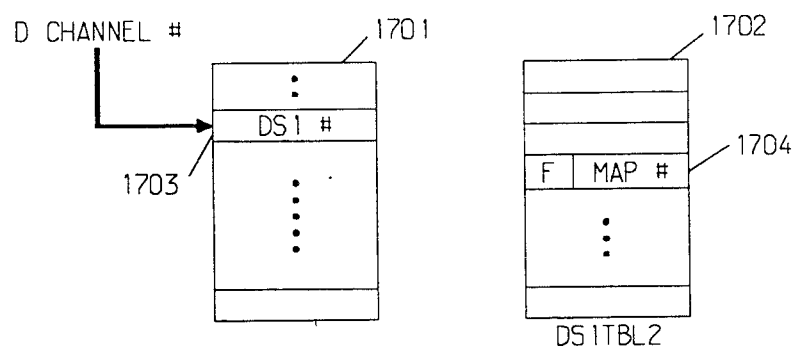
FIG. 17 illustrates tables for identifying conversion mapping on the basis of a D-channel number.

When a message is received having the elements 1405 of section 1420 as illustrated in FIG. 14 via path 313, block 1501 is executed. First, fields 1407, 1408, and 1409 are checked to make sure that these are valid. If these fields are not valid, then decision block 1502 transfers control to block 1519 which requests the transmission of a status message back to the sending system via message creation block 502. If these fields are valid, block 1503 is executed which utilizes the tables 1701 and 1702 illustrated in FIG. 17 to obtain the map number and map flag from word 1704. Table 1701 contains the translation from the D-channel number to the physical trunk or primary line which is illustrated in word 1703 as a DS1 trunk number. The flag bit of table 1702 identifies whether this particular trunk is to be mapped or not. The tables utilized to perform the mapping or converting are illustrated in FIG. 16. There is one set of tables 1605, 1606, and 1608 as illustrated in FIG. 16 for each mapping that is allowed. There is only one each of tables 1601 through 1604. Advantageously, a total of 16 mappings are allowed in the illustrative embodiment. However, a multitude of trunks and BRI lines can share the same mapping.

After the execution of block 1503, blocks 1504 through 1518 are repetitively executed as the message illustrated in FIG. 14 is processed with the necessary conversions being made as required. The message illustrated in FIG. 14 is similar to the message of FIG. 20 and precedes from codeset 0 through to codeset 7. Codeset transitions are indicated by a lock shift field such as field 1411. Lock shift field 1411 defines the next codeset which is codeset 7. Field 1410 is codepoint 24 in codeset 0 and corresponds to field 2010 of FIG. 20. Field 1413 is codepoint 40 in codeset 7 and corresponds to field 2011 of FIG. 20. Block 1504 monitors and supplies the proper codeset number for the processing. In addition, block 1504 is responsible for determining when a new codepoint is to be processed and for determining when the message is fully processed.

It is possible to receive an ISDN message that has no information elements. In that case, the message type field 1409 communicates the necessary information. Initially, assume that there are information elements to be processed, and block 1505 is executed to obtain the next information element. Decision block 1506 checks the codepoint value of the new IE to determine if it is less than the codepoint value of the previous IE. If the code value of the new IE is less than the codepoint value of the previous IE, then this IE is ignored and processing is returned to block 1504 since it is in error.

Block 1507 utilizes the codeset and codepoint values of the new IE to index into tables 1601 through 1604 of FIG. 16. Each of the latter tables contain 128 words each representing the total number of codepoints that can appear in a given codeset as defined by the full standard. The word retrieved from one of the tables 1601 through 1604 is the unconverted codeset and codepoint's bit position in IE bit map 1402 and is utilized to index into table 1605. First, decision block 1508 checks to see if the mapping flag was set (the mapping flag was retrieved in block 1503 from table 1702 of FIG. 17). If the mapping flag has not been set, this indicates that no mapping is to take effect, and block 1509 is executed next. With respect to FIG. 16, path 1610 indicates that the codeset and codepoint are not to be mapped and that the value obtained from one of tables 1601 through 1604 is correct. Where the mapping flag was not set and execution of block 1509 results in a "yes" block 1511 sets the appropriate bit in the IE bit map 1402 and saves the offset to the informational part of the IE in block 1403 so that this information can be retrieved at higher levels for processing. If execution of block 1509 results in a "no", block 1511 is executed which sets the appropriate bit in map 1402 and saves an offset to the IE in the corresponding offset in area 1403.

If the mapping flag is set, block 1514 is executed next. This corresponds to following path 1611 on FIG. 16 to access CS_PTR table 1605. The accessing of table 1605 is accomplished by block 1514. Even though this particular trunk or BRI line is mapped, the particular codepoint and codeset presently being processed may not be mapped. Whether or not a particular codeset and codepoint is mapped is indicated by a 0 or non-zero word in the indexed table 1605. Block 1515 checks to see whether the accessed word from table 1605 is 0. If the contents of the accessed word is 0 indicating no mapping, path 1612 is followed on FIG. 16 and blocks 1509 through 1511 are executed on FIG. 15 as previously described since this particular IE is treated as if it is to be unconverted.

If the word obtained from table 1605 is non-zero indicating that the IE is to be converted, then block 1516 is executed which it corresponds to path 1613 of FIG. 16. Block 1516 accesses CS_INC table 1606 utilizing the pointer obtained from CS_PTR table 1605. As illustrated in FIG. 16, the results of indexing into table 1606 can be either to delete this particular IE because it is not recognized by the system or it is a recognized mapping. If it is a recognized mapping, block 1517 indexes into CS_N_S table 1608. The latter table contains either a pointer into table 1606 or a zero. The zero indicates that the IE is not processed by the system and should be deleted. Block 1518 accesses CS_N_S table 1608 to obtain the actual bit position in IE bit map 1402 which is the converted position of the IE presently being processed. This converted position represents the conversion of codeset and codepoint. This is illustrated by paths 1615 and 1616 of FIG. 16.

In summary, the above description has described the processing of one IE with respect to codeset and codepoint values. A conversion is accomplished by determining where in the IE bit map 1402 the bit representing the converted-to codeset and codepoint should be set.

After one IE has been fully processed, control is passed to 1504 to determine whether there are any other IEs present in the message in block 1420 of FIG. 14. If there are more IEs to be processed, then blocks 1504 through 1518 are executed for this new IE. After there are no longer IEs to be processed, control is passed to decision block 1512. The latter decision block checks to see that all the mandatory IEs required for this particular message type are present. If the mandatory IEs are not present, then block 1519 is executed as previously described. If all the mandatory IEs are present, then the message which is now shown as being expanded in FIG. 14 is passed to message processing block 303 of FIG. 3.

Figure 18:
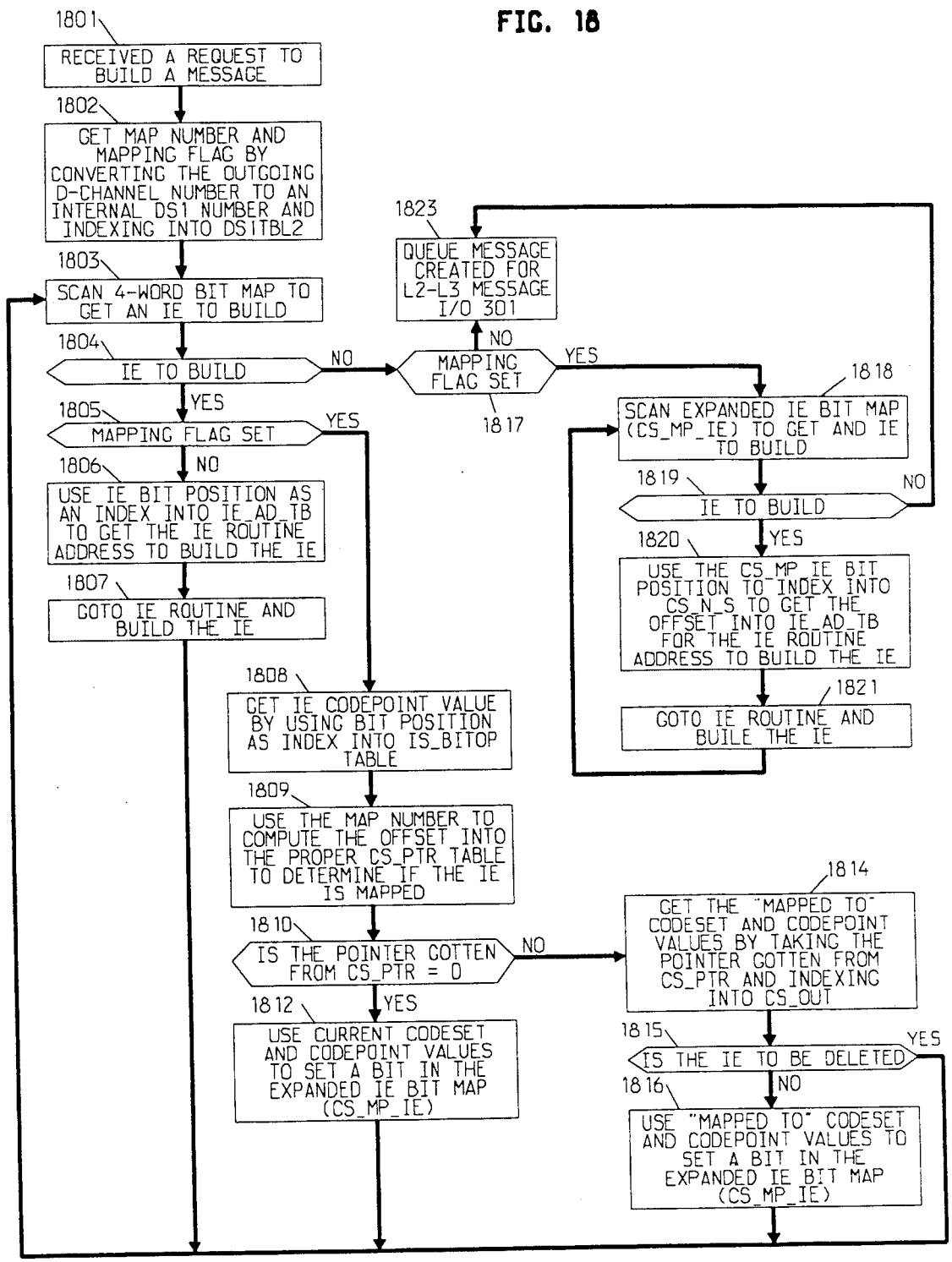
FIG. 18 illustrates, in flow chart form, message creation operations.
Figure 19:
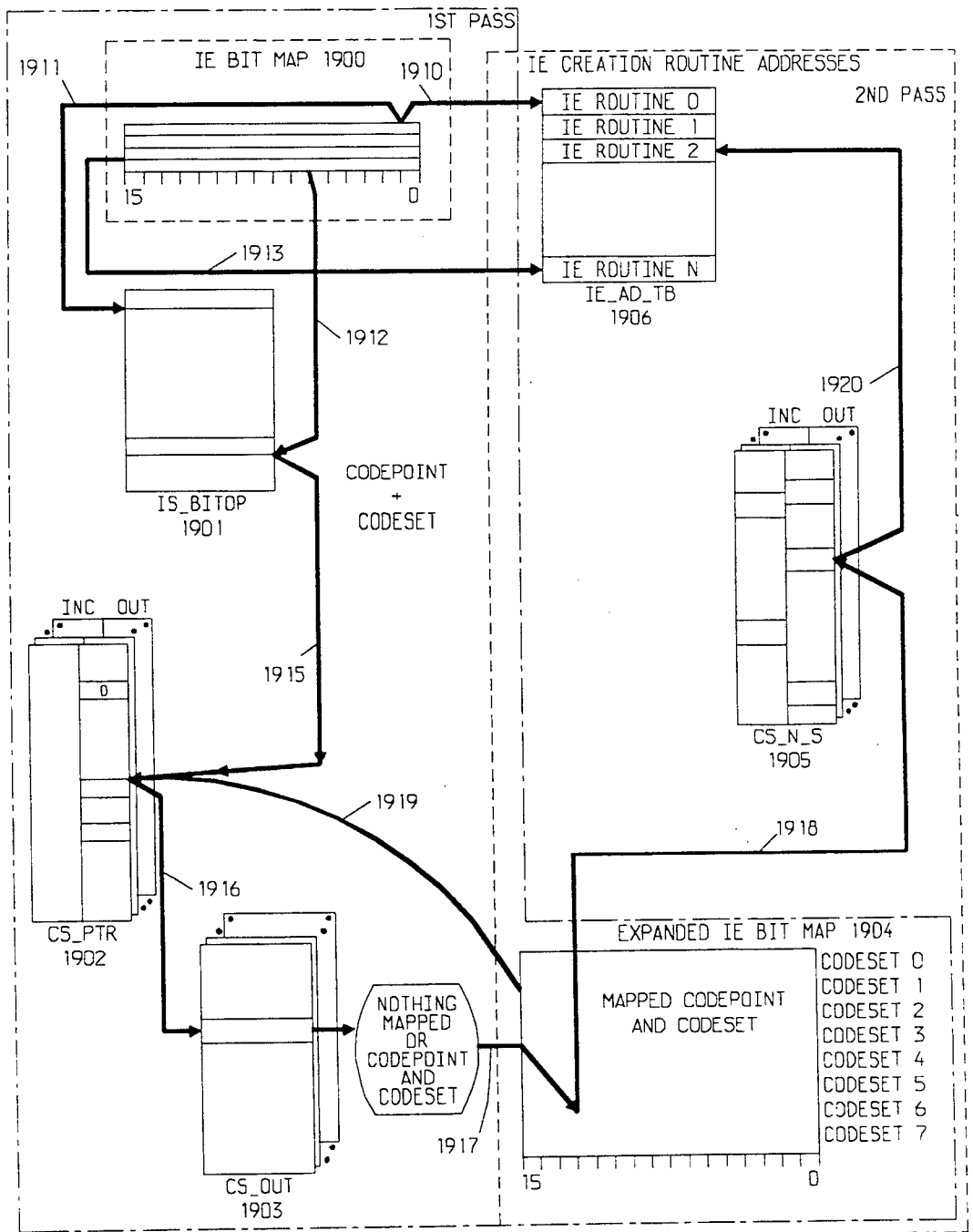
FIG. 19 illustrates tables used by the message creation operations.

FIG. 18 illustrates in greater detail the functions performed by message creation block 502 of FIG. 5. FIG. 19 illustrates the tables used for message creation and the flow of action through these tables in schematic form. There are sixteen sets of tables 1902, 1903 and 1905 in FIG. 19. One set of tables for each of the possible mappings. Via path 314, message creation block 502 receives a message. Block 502 allocates memory space and creates a buffer of information which is similar to that illustrated in FIG. 14. Block 1404 is not present in this new buffer, and the pointers listed in block 1403 may point to other locations other than block 1420 in order to identify information. This is particularly true when messages are simply being tandem through customer switching system 104. The four-word IE bit map 1900 is the central source of information for the conversion process. The bits of map 1900 are in occurrence with ascending codeset and codepoint. Because of the compacting of the codesets and the codepoints into 64 combinations, it is necessary to first expand out the IE bit map 1900 to form the expanded IE bit map 1904. This is necessary to assure that the message transmitted from customer switching system 104 is in ascending codeset order. To achieve the proper order, IE bit map 1904 must be formed to account for the shifting of codepoints from a lower order codeset to a higher order codeset.

As illustrated in FIG. 19, the process of creating a message is performed in a first and a second pass. In the first pass, IE bit map 1900 is converted into expanded IE bit map 1904 which is organized by codesets. After the expanded IE bit map 1904 has been formed which accomplishes the mapping or conversion of each codepoint and codeset to a new codepoint and new codeset, the information of map 1904 is used to index into table 1906 to determine which IE are to be executed. The determined IE routines actually form the message transferred to block 301 of FIG. 3 for subsequent transmission.

Block 1801 receives messages to be created from block 303 of FIG. 3 via path 314. First, block 1802 converts the outgoing D-channel number to an internal DS1 number representing a trunk or BRI line utilizing the tables illustrated in FIG. 17.

The flag bit of table 1702 determines whether a conversion is to be performed. The map number field of table 1702 defines which set of tables in FIG. 19 is to be used to perform mapping. Within IE bit map 1900 if a bit is set to a 1, this indicates that an IE is to be built for this particular unit, block 1803 scans IE bit map 1900 looking for 1's. Decision block 1804 determines from IE bit map 1900 whether or not there are any more IEs to build. Assuming it is the first pass as illustrated in FIG. 19, the answer is "yes" in decision block 1804; and decision block 1805 is executed to determine whether the mapping flag from table 1702 which was read in block 1802 is set. If the mapping flag is not set, then path 1910 or 1913 of FIG. 19 is followed, and the proper IE routine is executed to build the IE within the message. This is accomplished by blocks 1806 and 1807 of FIG. 18. Block 1806 obtains the address of the IE routine by using the IE bit position as an index into IE_AD_TB table 1906. Block 1807 uses the address found in table 1906 to execute the IE routine.

If block 1805 finds the mapping flag set, blocks 1808 through 1816 are executed. The execution of these blocks results in a bit being set in an expanded IE bit map 1904 corresponding to the converted codepoint and codeset represented by the bit in IE bit map 1900 presently being processed. First, block 1808 retrieves a value from IS_BITOP table 1901 defining the codepoint and codeset represented by the bit in IE bit map 1900. This is equivalent to path 1912 of FIG. 19. As previously stated, there is one set of tables 1902 and 1903 for each possible mapping. Block 1809 uses the mapping number obtained from table 1702 to select the proper CS_PTR table 1902 and CS_INC table 1903.

After selection of the set, table 1902 is indexed using the word extracted from table 1901. This is via path 1915 on FIG. 19. The contents of each table 1902 allows for all possible mappings of all codesets and codepoints which could be represented by the 64 bits present in IE bit map 1900.

Decision block 1810 interrogates the contents of the information read from table 1902. If the contents of this word are 0, that indicates that no conversion is to be done on this codeset and codepoint and control is transferred to block 1812. This is equivalent to following path 1919 on FIG. 19. Block 1812 uses the codeset and codepoint values to directly set a bit in expanded IE bit map 1904 since it is not necessary to perform an conversion.

If the pointer retrieved from table 1902 was non-zero, then block 1814 is accessed, and the contents of the pointer are used to point into CS_OUT table 1903. The indexed word of table 1903 is examined by decision block 1815 to determine if the IE should be deleted. If it is to be deleted, then no further actions are taken. However, if the IE is to be built, then block 1816 is executed which sets a bit in expanded IE bit map 1904 using the mapped to codeset and codepoint values obtained from CS_OUT table 1903. This is equivalent to following path 1917 of FIG. 19. This process is repeated by going back to block 1803.

When there are no further IEs to be built as indicated by the fact that there are no un-processed "1's" in IE bit map 1900, decision block 1817 is executed. If the mapping flag is not set, then block 1823 is simply executed which passes the formed message to block 301 of FIG. 3 for transmission from customer switching system 104. If the mapping flag is set, control is transferred to block 1818 which scans each of the bits in expanded IE bit map 1904 starting with codeset 0, bit 0. Decision block 1819 monitors this process to determine when there are no longer IEs to build. If there are still IEs to build, block 1820 is executed which uses a bit in bit map 1904 to address into CS_N_S table 1905 which contains an index into table 1906 so that the proper IE routine can be executed as illustrated by block 1821. Once all the IEs have been built as indicated by expanded IE bit map 1904, block 1823 is executed as previously described.

It is to be understood that the above-described embodiment is merely illustrative of the principles of the invention and that other arrangements may be devised by those skilled in the art without departing from the spirit and scope of the invention.

TABLE 1

| Customer Switching System 104 Information Elements | | |
| --- | --- | --- |
| Codeset | Information Elements | Codepoint |
| 0 | CHANGE STATUS | 1 |
| 0 | CONGESTION LEVEL | 3 |
| 0 | BEARER CAPABILITY | 4 |
| 0 | CAUSE | 8 |
| 0 | CONNECTED NUMBER | 12 |
| 0 | CALL IDENTITY | 16 |
| 0 | CALL STATE | 20 |
| 0 | CHANNEL IDENTIFICATION | 24 |
| 0 | PROGRESS INDICATOR | 30 |
| 0 | CONTINUITY REQUEST | 31 |
| 0 | NETWORK SPECIFIC FACILITY | 32 |
| 0 | TERMINAL CAPABILITIES | 36 |
| 0 | NOTIFICATION INDICATOR | 39 |
| 0 | KEYPAD | 44 |
| 0 | SIGNAL | 52 |
| 0 | SWITCH-HOOK | 54 |
| 0 | CALLING PARTY NUMBER | 108 |
| 0 | CALLING PARTY SUBADDRESS | 109 |

TABLE 1-continued

Customer Switching System 104 Information Elements

| Codeset | Information Elements | Codepoint |
|---|---|---|
| 0 | CALLED PARTY NUMBER | 112 |
| 0 | CALLED PARTY SUBADDRESS | 113 |
| 0 | REDIRECTING NUMBER | 116 |
| 0 | TRANSIT NETWORK SELECTION | 120 |
| 0 | RESTART INDICATOR | 121 |
| 0 | LOW LAYER COMPATIBILITY | 124 |
| 0 | USER-USER INFORMATION | 126 |
| 6 | USER ENTERED CODE | 2 |
| 6 | TRAVELING CLASS MARK | 8 |
| 6 | TRUNK GROUP/TRUNK IDENTIFICATION | 10 |
| 6 | TRUNK GROUP/TRUNK STATUS | 11 |
| 6 | SUBNETWORK TRUNKING | 12 |
| 6 | PACKET MODE LOGICAL LINK IDENTIFIER | 26 |
| 6 | AT&T STANDARDIZED FACILITIES | 28 |
| 6 | ASSOCIATED TYPE | 33 |
| 6 | SELECTED CALL APPEARANCE | 34 |
| 6 | ORIGINATION CALL APPEARANCE | 35 |
| 6 | DESTINATION CALL APPEARANCE | 37 |
| 6 | ENDPOINT IDENTIFIER | 38 |
| 6 | NOTIFICATION INDICATOR | 39 |
| 6 | DISPLAY | 40 |
| 6 | KEYPAD CONTROL | 50 |
| 6 | OTHER CALL REFERENCE | 55 |
| 6 | FEATURE ACTIVATION | 56 |
| 6 | FEATURE INDICATION | 57 |
| 6 | ADJUNCT CONTROL | 58 |
| 6 | DISPLAY CONTROL | 59 |
| 6 | DISPLAY FIELD | 60 |
| 6 | PACKET MODE PACKET LAYER PARAMETERS | 62 |
| 6 | PACKET MODE LINK LAYER PARAMETERS | 64 |
| 6 | THROUGHPUT CLASS | 98 |
| 6 | MANAGEMENT | 122 |
| 6 | LOOKAHEAD INTERFLOW | 123 |
| 7 | SPECIFIC EVENT | 71 |
| 7 | CALL OPTIONS | 75 |
| 7 | CONNECTION DELAY | 81 |
| 7 | ASSOCIATED PARTY NUMBER | 82 |
| 7 | MERGE REQUEST | 83 |

TABLE 2

Customer Switching System 102 Information Elements

| Codeset | Information Element | Codepoint |
|---|---|---|
| 0 | CHANGE STATUS | 1 |
| 0 | BEARER CAPABILITY | 4 |
| 0 | CAUSE | 8 |
| 0 | CONNECTED NUMBER | 12 |
| 0 | CALL STATE | 20 |
| 0 | CHANNEL IDENTIFICATION | 24 |
| 0 | PROGRESS INDICATOR | 30 |
| 0 | NETWORK SPECIFIC FACILITY | 32 |
| 0 | CALLING PARTY NUMBER | 108 |
| 0 | CALLED PARTY NUMBER | 112 |
| 0 | CALLING PARTY SUBADDRESS | 113 |
| 0 | REDIRECTING NUMBER | 116 |
| 0 | TRANSIT NETWORK SELECTION | 120 |
| 0 | RESTART INDICATOR | 121 |
| 0 | LOW LAYER COMPATIBILITY | 124 |
| 0 | USER-USER INFORMATION | 126 |
| 7 | PACKET MODE LINK LAYER PARAMETERS | 1 |
| 7 | PACKET MODE PACKET LAYER PARAMETERS | 2 |
| 7 | PACKET MODE LOGICAL LINK IDENTIFIER | 4 |
| 7 | TRAVELING CLASS MARK | 8 |
| 7 | DISPLAY | 40 |
| 7 | SPECIFIC EVENT | 71 |
| 7 | CALL OPTIONS | 75 |
| 7 | CONNECTION DELAY | 81 |
| 7 | ASSOCIATED PARTY NUMBER | 82 |
| 7 | MERGE REQUEST | 83 |

TABLE 2-continued

Customer Switching System 102 Information Elements

| Codeset | Information Element | Codepoint |
|---|---|---|
| 7 | LOOKAHEAD INTERFLOW | 123 |

We claim:

1. In a communication system in which ISDN messages are communicated via ISDN communication links between a first communication switching system and a plurality of other communication systems, a method for use in said first communication switching system comprising the steps of:

storing information identifying those of said communication links that connect to communication systems which process messages using a different set of ISDN codepoint and codeset identifiers than the particular set by which messages are processed by said first communication switching systems;

receiving an ISDN message from an individual one of said other communication systems;

determining from the stored information and as a function of the identity of the communication link over which said message was received whether said message uses a set of identifiers different from said particular one set and, if said messages does; and converting said message to a form in which said particular one set is used.

2. The method of claim 1 further comprising the steps of:

generating another ISDN message using said particular set of ISDN identifiers by said first communication switching system for communication to another individual one of said other communication switching systems, identifying another communication link to be used to communicate said other ISDN message to said other one of said other communication switching systems, determining from said stored information and as a function of said other communication link whether said other one of said other communication switching systems expects a set of identifiers different from said particular set of identifiers, if said other one of said other communication switching systems does, converting said other message to a form in which said set of identifiers excepted by said other one of said other communication switching systems is used.

3. The method of claim 1 wherein said step of storing comprises storing a link table defining which ones of said communication links communicate messages using sets of identifiers different from said particular one set, and said step of determining comprises the step of accessing said link table to determine whether said message uses a set of identifiers different from said particular one set.

4. The method of claim 3 wherein said storing information further comprises storing groups of conversion tables each identified with an individual one of said communication links, and said step of determining further comprises the step of selecting one of said groups of conversion tables.

5. The method of claim 4 wherein said step of converting comprises the step of accessing said selected one of said groups of conversion tables to obtain the correspondence between said particular one set and the set of identifiers used in said message.

6. In a communication system in which ISDN messages are communicated via ISDN communication links between a first communication switching system and a plurality of other communication systems, an apparatus in said first communication switching system comprising:

means for storing information identifying those of said communication links that connect to communication systems which process messages using a different set of ISDN codepoint and codeset identifiers than the particular set by which messages are processed by said first communication switching systems;

means for receiving an ISDN message from an individual one of said other communication systems;

means for determining from the stored information and as a function of the identity of the communication link over which said message was received whether said message uses a set of identifiers different from said particular one set and, if said messages does; and means for converting said message to a form in which said particular one set is used.

7. The apparatus of claim 6 further comprising:

means for generating another ISDN message using said particular set of ISDN identifiers by said first communication switching system for communication to another individual one of said other communication switching systems, means for identifying another communication link to be used to communicate said other ISDN message to said other one of said other communication switching systems, means for determining from said stored information and as a function of said other communication link whether said other one of said other communication switching systems expects a set of identifiers different from said particular set of identifiers, if said other one of said other communication switching systems does, means for converting said other message to a form in which said set of identifiers excepted by said other one of said other communication switching systems is used.

8. The apparatus of claim 6 wherein said means for storing comprises storing a link table defining which ones of said communication links communicate messages using sets of identifiers different from said particular one set, and said means for determining comprises means for accessing said link table to determine whether said message uses a set of identifiers different from said particular one set.

9. The apparatus of claim 8 wherein said means for storing information further comprises storing groups of conversion tables each identified with an individual one of said communication links, and said means for determining further comprises means for selecting one of said groups of conversion tables.

10. The apparatus of claim 9 wherein said means for converting comprises means for accessing said selected one of said groups of conversion tables to obtain the correspondence between said particular one set and the set of identifiers used in said message.

* * * * *